United States Patent [19]

Chino et al.

[11] Patent Number: 4,854,262
[45] Date of Patent: Aug. 8, 1989

[54] COATING APPARATUS

[75] Inventors: Naoyoshi Chino; Yasuhito Hiraki; Tsunehiko Sato, all of Kanagawa, Japan

[73] Assignee: Fuji Photo Film Co., Ltd., Kanagawa, Japan

[21] Appl. No.: 102,921

[22] Filed: Sep. 30, 1987

[30] Foreign Application Priority Data

Sep. 30, 1986 [JP] Japan ................... 61-230173

[51] Int. Cl.$^4$ ............................. B05C 3/02
[52] U.S. Cl. ..................... 118/411; 427/356
[58] Field of Search ............ 118/410, 411; 427/356

[56] References Cited

U.S. PATENT DOCUMENTS 4,537,801  8/1985  Takeda ..................... 118/411 X
4,748,057  5/1988  Kageyama et al. .......... 427/356

FOREIGN PATENT DOCUMENTS 49-29944   8/1974  Japan .
138036    11/1975  Japan .
56-12937   3/1981  Japan .
109162     6/1983  Japan .
238179    11/1985  Japan .

Primary Examiner—Shrive Beck
Assistant Examiner—Alain Bashore
Attorney, Agent, or Firm—Sughrue, Mion, Zinn, Macpeak & Seas

[57] ABSTRACT

An extrusion type coating head having a back edge, and two doctor edges arranged along the direction of a moving web with slots therebetween for coating solutions to be applied to the web. Both of the doctor edges are convex toward the web.

6 Claims, 3 Drawing Sheets

COATING APPARATUS

BACKGROUND OF THE INVENTION

1. Field of the Invention

The present invention relates to an apparatus for simultaneously applying a plurality of layers onto a moving support or web. Particularly, the present invention relates to an improvement in an extruder used in an apparatus for simultaneously applying a plurality of layers of magnetic recording media. The extruder is of the type provided with doctor edges formed at a top end part of the apparatus, whereby coating compositions continuously extruded toward the surface of a moving support are applied to a uniform thickness onto the surface of the support through the doctor edges.

The term "support" used in this specification includes flexible sheets or webs formed of resin film, paper, polyolefin-coated paper, metal e.g., aluminum, or the like. Further, the supports of this type may have a sub layer or the like. The supports of this type are coated with various kinds of coating compositions, such as magnetic coating compositions, photographic light-sensitive coating compositions, or the like, to produce magnetic tape, various kinds of photographic film and paper, or the like.

2. Background of the Invention

As magnetic recording media have been developed into high density and thin film form in recent years, the structure of magnetic layers has been shifted from a monolayer structure to a multilayer one.

Supports provided with sub layers or the like have an advantage in that the supports adheres firmly to magnetic layers or back layers. Further, media having multiple magnetic recording layers have an advantage in that the capacity of magnetic data storage is remarkably improved compared to that in media having a single magnetic recording layer. Accordingly, structures of multiple layers, such as, for example, two layers or four layers, have been required in the recent years.

On the other hand, heretofore such a multilayer structure has been attained by repeating the coating and drying process layer by layer.

The method, however, suffers from poor production efficiently, because the coating and drying must be repeated. Further, it has a disadvantage in that undesirable modulation signals often occur due to an evenness of magnetic recording elements in the interface between coating layers.

Hence, a method of simultaneously applying and drying multiple layers by a single coating and drying process would be desired. However, it is self-evident that some conventional coating methods such as a roll coating method, a gravure coating method and a combination method of doctor coating and roll or extrusion coating, which have been mainly used for manufacturing magnetic recording media, are unsuitable for simultaneous formation of multiple layers.

On the other hand, a slide coating method employing slots has been proposed as one of multilayer coating methods for manufacturing photographic light-sensitive materials. Further, Japanese Patent Publication No. 56-12937 (1981) has disclosed a multilayer coating method for magnetic recording materials in which a coating composition to be applied is caused to flow out along a slide surface of a slide hopper. Such slide coating methods, however, are unsuitable for manufacturing magnetic recording media, because the coating composition to be used is a highly viscous and aggregative "organic solvent dispersed liquid", which is easily dried and unsuited to high-speed application.

Further, various extrusion type coating methods have been proposed but most of the methods are merely suited to monolayer coating.

On the other hand, Japanese Patent Application Laid-open No. 58-109162 (1983) has disclosed a multilayer forming method using an extrusion coating head to be pressed to a support. However, the structure of the coating head described in the Japanese Patent Application Laid-open No. 58-109162 (1983) is not sufficient to solve the aforementioned problems. The method still has many problems, in which coating trouble, such as streak-like irregularity, thickness irregularity and the like, often occurs when multiple magnetic recording layers are formed. Further, for example in Japanese Patent Application Laid-open No. 60-238179 (1985), a coating head using an R-shaped doctor edge has been disclosed. It is known that the aforementioned problems in streak-like irregularity and the like can be eliminated to some extent by the R-shape structure. However, that shown in the Japanese Patent Application Laid-open No. 60-238179 (1985) is not such a multilayer coating method as is the subject of the present invention but only a monolayer coating method. Generally a coating mechanism in the simultaneous multilayer coating method is relatively complex compared to that in the monolayer coating method. Accordingly, no means has been disclosed which is effective for the simultaneous multilayer coating method.

Further, as a method using an extrusion type coating head, a multilayer coating method has been disclosed in Japanese Patent Publication No. 49-29944 (1974) and Japanese Patent Application Laid-open No. 50-138036 (1975). According to the Japanese Patent Publication No. 49-29944 (1974), a doctor edge surface is shaped like a plane. For this reason, the aforementioned problem in streak-like irregularity and thickness irregularity still has arisen so that the thus produced products have been scarcely fit for use with respect to their surface quality. According to the Japanese Patent Application Laid-open No. 50-138036 (1975), the doctor edge is further improved to have a curved surface. However, it fails completely to disclose conditions for simultaneous multilayer coating at all.

In short, there has been disclosed no effective means to clear up how to apply the first layer and how to apply the second layer without a deleterious influence on the first layer.

SUMMARY OF THE INVENTION

In view of the foregoing circumstances and the trend toward multiple magnetic recording layers in recent years, an object of the present invention is to provide a coating apparatus in which high-speed coating can be achieved without streak-like and thickness irregularities in the coating layers.

After investigation, the inventors of this application have found that the object of the present invention can be attained by the following coating apparatus.

That is, in order to attain the foregoing object, according to the present invention, in the coating apparatus including an extrusion type head having at least two slots, a back edge, and at least a first and a second doctor edge. Each of the first and second doctor edges is shaped to have curvature in cross section taken along the direction of movement of a support to which as coating composition is to be applied, the curvature expanding toward the support.

BRIEF DESCRIPTION OF THE DRAWINGS

The foregoing and other objects of the invention will be seen by reference to the description, taken in connection with the accompanying drawings, in which.

DESCRIPTION OF THE PREFERRED EMBODIMENT

Figure 1:
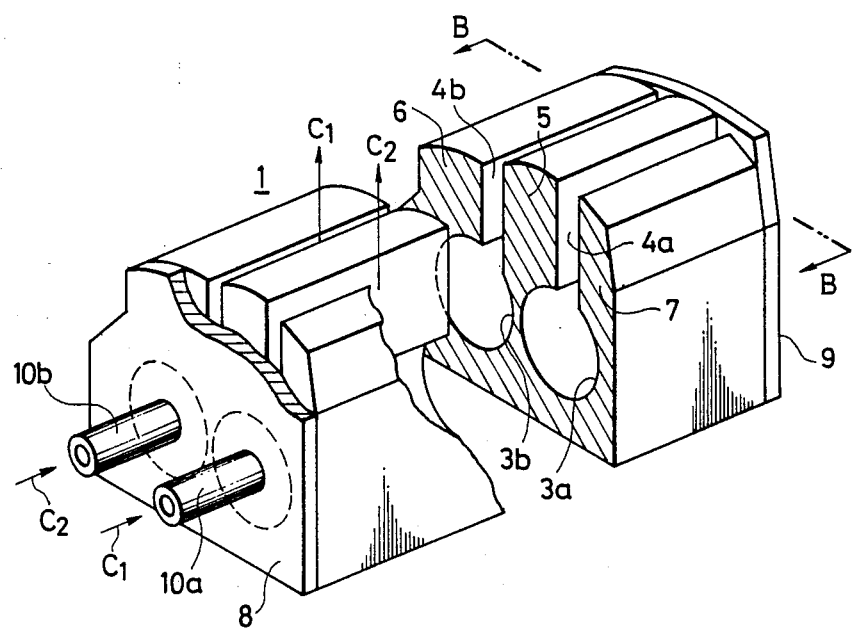
FIG. 1 is a partly cutaway perspective view of an extruder in an apparatus according to an embodiment of the present invention.
Figure 2:
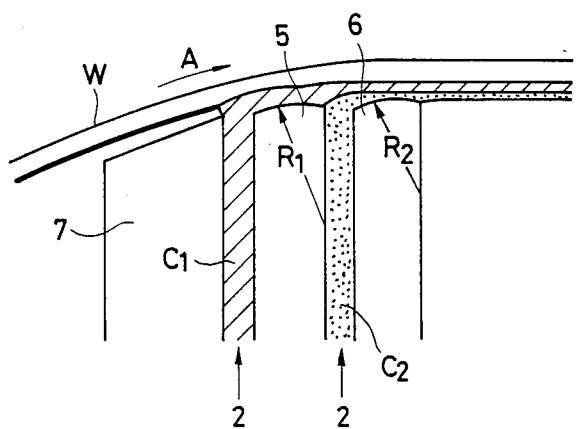
FIGS. 2, 3 and 4 are section a views taken along the line B—B of FIG. 1.
Figure 3:
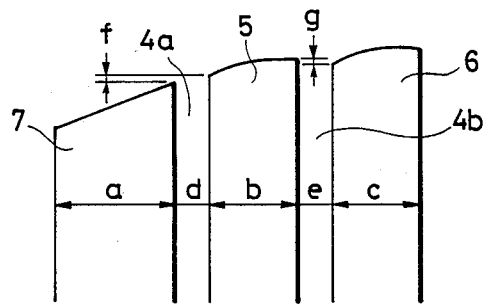

FIGS. 1, 2 and 3 illustrate an embodiment of the present invention, in which an extruder 1 can be divided into a liquid supply system 2, a pocket section 3a and 3b, a slot section 4a and 4b, a doctor edge section 5 and 6 and a back edge section 7, which will be respectively described in detail hereunder.

1. Liquid Supply System:

The liquid supply system 2 includes quantitative pump means (not shown) disposed at the outside of a body of an extruder 1 to make it possible to accurately and quantitatively send the coating composition $C_1$ and $C_2$ continuously. Piping members communicate the pump means with two pockets 3a and 3b which are provided to pass through the body of the extruder 1 in the widthwise direction of a moving support W.

2. Pocket Section:

Each of the two pocket 3a and 3b is a kind of liquid reservoir which is substantially circularly shaped in sectional view, as shown in FIG. 1, and which is extended with substantially the same cross section in the widthwise direction of the support W.

The effective length of the extension is generally determined to be equal to or slightly longer than the width of coating.

The internal diameter in each of the pockets 3a and 3b is generally determined to be within a range of from 3 to 100 mm. As shown in FIG. 1, opposite opening ends of the pockets are respectively closed by shield plates 8 and 9 attached to opposite ends of the extruder 1.

The liquid supply system 2, including the piping members, is connected to short pipes 10a and 10b extending from the shield plate 8 so that the pockets 3a and 3b can be filled with the coating composition $C_1$ and $C_2$ through the pipes 10a and 10b. As a result, the coating compositions $C_1$ and $C_2$ can be pressed with uniform liquid pressure out to the support W through slots 4a and 4b which will now be described.

3. Slot Section:

The slots 4a and 4b are relatively narrow flow paths which pass through the body of the extruder 1 from the pockets 3a and 3b to the support W to form openings with respective widths d and e of 0.01 to 3 mm. These openings extend in the widthwise direction of the support W in the same manner as described above for the pockets 3a and 3b. The opening length of each of the slots 4a and 4b in the widthwise direction of the slots 4 and and 4b in the widthwise direction of the support W is made substantially equal to the width of coating.

The length of the flow path in each of the slots 4a and 4b toward the support W can be suitably established taking into consideration the conditions, such as liquid contents, physical property, supply flow rate, supply liquid pressure, etc., of the coating compositions $C_1$ and $C_2$. In short, it is preferable that the coating compositions $C_1$ and $C_2$ laminarly flow out from the pockets 3a and 3b with uniform flow rates and uniform liquid pressure in the widthwise direction of the support W.

4. Doctor Edges and Back Edge

The edge surface of each of the two doctor edges 5 and 6 is shaped to have curvature in a sectional view taken along the direction of movement of the support W. The curvature is convex, that is, expanding toward the support W. The radii of of curvature $R_1$ and $R_2$ of the edge surface of the respective doctor edges 5 and 6 satisfy the relations:

$R_1 \geq 2$ mm,
$R_2 \geq 2$ mm, and
$-3$ mm $\leq R_2 - R_1 \leq 15$ mm.

Each of the respective widths b and c of the doctor edges 5 and 6 (taken along the direction of movement of the support W) is 0.1 mm to 10 mm, preferably 0.5 mm to 5 mm. The widths b and c can be suitably established independently of the radii of curvature $R_1$ and $R_2$. Although FIG. 2 shows the case where the center in each of the radii $R_1$ and $R_2$ of curvature is located at the inside of each of the first and second doctor edges 5 and 6, it is to be understood that the present invention is not limited to the specific embodiment but the positions of the curvature centers can be suitably selected to determined the relative positions of the edge surfaces as long as the following conditions are satisfied.

Figure 4:
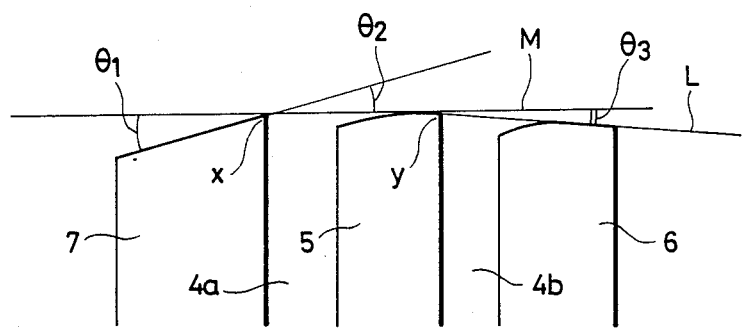

That is, as shown in FIG. 4, let $\theta_1$ be the inclination angle of the back edge surface; let $\theta_2$ be the angle between the extension of the back edge surface and a first tangent M to the edge surface of the first doctor edge 5 from the top x which is a slot exit end of the back edge surface; and let $\theta_2$ be the angle between the extension of the first tangent M and second tangent L to the edge surface of the second doctor 6 from the top y which is a slot extend of the edge surface of the first doctor edge 5. The angle $\theta_1$ is within a range of $0.5° < \theta_1 \leq 35°$, preferably $5° \leq \theta_1 \leq 25°$. The angle $\theta_2$ is within a range of $0° < \theta_2 \leq 20°$, preferably $2° \leq \theta_2 \leq 15°$. The angle $\theta_3$ is within range of $0° < \theta_3 \leq 20°$, preferably $1° \leq \theta_3 \leq 15°$.

Although FIGS. 1 to 4 show the case where the edge surface of the back edge 7 is shaped like a plane, it is to be understood that the present invention is not limited to the specific a embodiment but the edge surface of the back edge may be formed by combination of a plurality of planes or may be formed as a curved surface with a predetermined radius of curvature.

Further, both of the gaps f and g in the slot exit ends as shown in FIG. 3 can be established at any suitable value within a range of $-300$ μm to $+300$ μm.

Further, at least top ends of the back edge 7 and the doctor edges 5 and 6 are formed of hard material, such as for example (non-magnetic or magnetic) hard metal or ceramics having a hardness of about 85 degrees according to the Rockwell A-scale.

According to the apparatus of the present invention, the support W which is stretched by substantially constant tension between moving guide means such as guide rollers or the like and which is capable of being curved in the direction of thickness is slightly curved along the edge surfaces of the doctor edges 5 and 6 and the back edge 7 by extruder supporting means (not shown). When the coating compositions $C_1$ and $C_2$ are sent from the liquid supply system 2 at suitable flow rates, the coating compositions $C_1$ and $C_2$ are successively passed via the pockets 3a and 3b and the slots 4a and 4b and extruded to the exit ends of the slots 4a and 4b at uniform flow rates and pressures perpendicularly in the widthwise direction of the support W.

The coating composition $C_1$ (lower layer) extruded to the exit end of the slot 4a located at the upstream side with respect to the direction of movement of the support W slightly overflows from the edge surface of the back edge 7 facing the support W. It thereby forms a kind of bead between the support W and the edge surface so that the coating composition $C_1$ moves along the surface of the support W so as to be spread between the edge surface of the first doctor edge 5 and the support W. On the other hand, the coating composition $C_2$ (upper layer) extruded to the exit end of the slot 4b located at the downstream side with respect to the direction of movement of the support W is spread between the coating composition $C_1$ and the edge surface of the second doctor edge 6. As a result, the coating composition $C_2$ is applied onto the coating composition $C_1$.

When the aforementioned movement of the coating compositions $C_1$ and $C_2$ is continuously maintained, the surface of the support W, of course, is completely separated at a predetermined distance from the entire edge surfaces of the first and second doctor edges 5 and 6. The intervening distance is filled by the coating compositions $C_1$ and $C_2$ transversely passed as thin layers over the entire region in the widthwise direction of the support W.

The distance of separation is determined by the conditions, such as the tension of the support W, the distance between the support W and the extruder 1, the supply rate (liquid pressure) of the coating compositions $C_1$ and $C_2$, the moving speed of the support W, and the like. Particularly, the necessary distance, that is, the necessary thickness of coating film, can be easily and accurately attained by changing only the supply quantities of the coating compositions $C_1$ and $C_2$.

If the doctor edges 5 and 6 are provided to satisfy the aforementioned conditions in the manner as described above for the extruder 1 of the present invention, the coating compositions can be speedly and smoothly, laminarly and simultaneously applied to the support W without an increase of shearing stress and without defects, such as a streak-like irregularity, a thickness irregularity and the like of the coating film.

Comparing the radii $R_1$ and $R_2$ of curvature in consideration of the coating rates of the coating compositions $C_1$ and $C_2$, a considerable quantity of coating composition $C_2$ must be applied by the second doctor edge 6 when the coating composition $C_2$ is sufficiently large in coating quantity compared to the coating composition $C_1$. Accordingly, $R_2$ must be larger than $R_1$. It is preferable that the width c of the second doctor edge 6 is determined corresponding to the relation of $R_1$ and $R_2$.

On the contrary, when the coating composition $C_2$ is supplied at a sufficiently low rate compared to that of the coating composition $C_1$, the radius of curvature $R_1$ may be made equal to the radius of curvature $R_2$. Or $R_1$ may be larger than $R_2$ or may be smaller than $R_2$, but it is preferable that the difference between $R_1$ and $R_2$ is made sufficiently small.

The method for supplying the coating solutions to the extruder 1 as shown in FIG. 1 is a kind of single-sided supply method of sending the coating solutions through the short pipes 10a and 10b.

Figure 5:
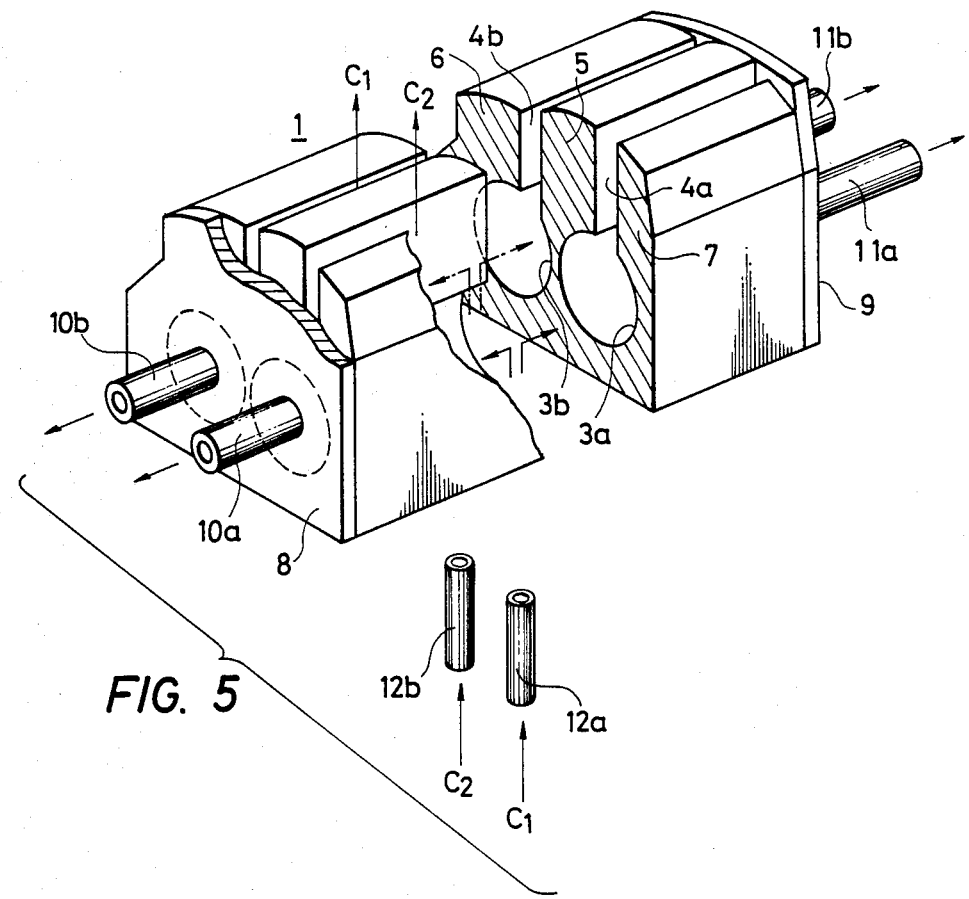
FIG. 5 is a perspective view showing a modification of the system for supplying the coating compositions to the extruder depicted in FIG. 1.

FIG. 5 shows a central supply method in which a pair of short inlet pipes 12a and 12b and two pairs of short outlet pipes 10a and 10b, and 11a and 11b, are attached to be located at the center portions and the end portions of the pockets 3a and 3b to thereby supply the coating compositions $C_1$ and $C_2$ through the short inlet pipes 12a and 12b.

Figure 6:
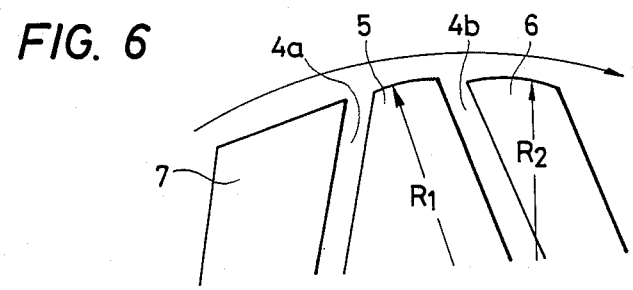
FIG. 6 is a section view showing a modification of the slots.

It is to be understood that the coating composition supply method used in the present invention is not limited to the specific embodiments but these embodiments may be suitably used in combination. Further, it is a matter of course that the shape of each of the pockets 3a and 3b is not limited to the aforementioned circular form but it may be suitably shaped like a square or a ship's bottom as long as uniform liquid pressure can be attained in the width direction. Although the embodiments show the case where the slots 4a and 4b are provided to be parallel to each other and substantially perpendicular to the support W, it is to be understood that the invention is not limited thereto but the slots may be inclined relative to other as shown in FIG. 6.

The apparatus of the present invention as described above has the following novel effects.

The extruder 1 according to the invention has a structure capable of simultaneously applying at least two kinds of coating compositions onto a support. Each of the edge surface of the doctor edges used for applying the coating compositions are shaped as a curved surface so as to expand toward the support. The relation of the radii of curvature of the respective doctor edge surfaces and the positional relation of the edge surfaces are established to satisfy the aforementioned conditions. Accordingly, an increase of shearing stress during coating can be prevented to make it possible to apply the coating compositions to each other smoothly. Further, coating film irregularity, such as streak-like irregularity of thickness irregularity, can be prevented. Thus, high-quality multilayer production can be made speedily without mismatching of the interface between coating layers.

In the following examples novel effects of the apparatus according to the present invention are described more clearly.

EXAMPLE 1

A coating composition as shown in Table 1 (corresponding to the coating composition $C_1$ as shown in FIG. 1) was used as a first layer (lower layer), and a coating composition as shown in Table 2 (corresponding to the coating composition $C_2$ as shown in FIG. 1) was used as a second layer (upper layer).

TABLE 1

| Coating Composition of First layer | |
|---|---|
| Carbon black (MICT, mean particle size: 250 μm) | 200 parts by weight |
| Polyurethane resin (Trade name: NIPPOLLAN-7304, Nippon Polyurethane Co., Ltd.) | 80 parts by weight |
| Phenoxy resin (Trade name: PKH-1, Union Carbide Corp.) | 35 parts by weight |
| Copper oleate | 1 part by weight |
| Methylethyl ketone | 500 parts by weight |

TABLE 2

| Coating Composition of Second Layer | |
|---|---|
| Co-containing magnetic iron oxide ($S_{BET}$: 35 m/g) | 100 parts by weight |
| Nitrocellulose | 10 parts by weight |
| Polyurethane resin (Trade name: NIPPOLLAN-2304, Nippon Polyurethane Co., Ltd.) | 8 parts by weight |
| Polyisocyanate | 8 parts by weight |
| $Cr_2O_5$ | 2 parts by weight |
| Carbon black (mean particle diameter: 20 μm) | 2 parts by weight |
| Stearic acid | 1 part by weight |
| Butyl stearate | 1 part by weight |
| Methylethyl ketone | 300 parts by weight |

The viscosity of each of the coating composition shown in Tables 1 and 2 was measured. The viscosity of the lower layer coating composition $C_1$ was 0.2 poise at the shearing rate of $1 \times 10^4 \text{ sec}^{-1}$. The viscosity of the upper layer coating composition $C_2$ was 0.3 poise at the shearing rate of $1 \times 10^4 \text{ sec}^{-1}$.

1. Support:
Material: Polyethylene terephthalate film
Width: 400 mm
Thickness: 75 μm
Tension at the coating portion: 20 kg/500 mm
Moving speed of the support was 100 m/min.

The coating quantity in the lower layer of the magnetic coating compositions was 15 cc/m², and the coating quantity in the upper layer of the same was 10 cc/m².

2. The extruder according to the present invention was used. The radius of curvature $R_1$ of the edge surface of the first doctor edge was selected to be 6 mm. Coating conditions were estimated while changing the radius of curvature $R_2$ of the edge surface of the second doctor edge. The estimated results were as shown in Table 3, in which the symbol 0 represents success in normal application of the second layer, the symbol X−1 represents failure in normal application because of the overflow of the coating compositions onto the back edge, and the symbol X−2 represents failure in normal application because of the mixing of air into the upper layer.

TABLE 3

| $R_2$ (mm) | 2 | 3 | 6 | 8 | 16 | 21 | 25 |
|---|---|---|---|---|---|---|---|
| Estimation of coating conditions | X-1 | 0 | 0 | 0 | 0 | 0 | X-2 |

EXAMPLE 2

The coating compositions for the lower and upper layers were prepared in the same manner as those of Example 1. The support was prepared in the same manner as that of Example 1. The coating rate of the lower layer was 5 cc/m², and the coating quantity of the upper layer was 10 cc/m². The radius of curvature $R_1$ of the edge surface of the first doctor edge was established to be 4 mm. Coating conditions were estimated while changing the radius of curvature $R_2$ of the edge surface of the second doctor edge. The results of estimation are shown in Table 4, in which symbols 0, X−1 and X−2 represent the same estimates as defined above in Table 3.

TABLE 4

| $R_2$ (mm) | 2 | 4 | 6 | 8 | 10 | 14 | 19 | 21 |
|---|---|---|---|---|---|---|---|---|
| Estimation of coating conditions | 0 | 0 | 0 | 0 | 0 | 0 | 0 | X-2 |

EXAMPLE 3

The coating compositions for the lower and upper layers were prepared in the same manner as those of Example 1. The support was prepared in the same manner as that of Example 1. The coating rate in the lower layer was 30 cc/m², and the coating rate in the upper layer was 5 cc/m². The radius of curvature $R_1$ of the edge surface of the first doctor edge was established to be 10 mm. Coating conditions were estimated while changing the radius of curvature $R_2$ of the edge surface of the second doctor edge. The results of estimation are shown in Table 5, in which symbols 0, X−2 and X−2 represent the same estimates as defined above in Table 3.

TABLE 5

| $R_2$ (mm) | 5 | 7 | 10 | 14 | 18 | 20 | 25 | 30 |
|---|---|---|---|---|---|---|---|---|
| Estimation of coating conditions | X-1 | 0 | 0 | 0 | 0 | 0 | 0 | X-2 |

The aforementioned Examples were estimated while changing the radius of curvature $R_1$ and $R_2$ of the respective edge surfaces in the cases where the coating quantities in the upper and lower layers were established to typical values. It is apparent from the results that good coating can be attained in the case where $R_1$ and $R_2$ satisfy the relation, $-3 \text{ mm} \leq R_2 - R_1 \leq 15 \text{ mm}$, for various values of the coating quantities in the upper and lower layers.

In the following examples, use of coating compositions different from the aforementioned coating compositions is described.

EXAMPLE 4

The coating composition as shown in Table 6 was used as a lower layer, and the coating composition as shown in Table 2 was used as an upper layer. The support was 15 μm thick and the other conditions were established in the same manner as defined in Example 1. The coating quantity of the lower layer was 8 cc/m², and the coating quantity of the upper layer was 20 cc/m². The radius of curvature $R_1$ of the first doctor edge was established to be 6 mm. Coating conditions were estimated while changing the radius of curvature $R_2$ of the second doctor edge. The results of estimation were shown in Table 7, in which symbols 0, X−1 and X−2 represent the same estimates as defined above in Example 1.

TABLE 6

| Methylethyl ketone | 100 parts by weight |
|---|---|
| Toluene | 100 parts by weight |
| Nitrocellulose | 5 parts by weight |

The viscosity of the coating composition as shown in Table 6 was measured with a Vismetron, thereby measuring a viscosity of 1.3 cp.

TABLE 7

| $R_2$ (mm) | 3 | 5 | 8 | 10 | 15 | 18 | 20 |
|---|---|---|---|---|---|---|---|
| Estimation of coating condition | X−1 | 0 | 0 | 0 | 0 | 0 | X−2 |

EXAMPLE 5

The coating composition as shown in Table 8 was used as an upper layer. The coating composition prepared in the same manner as that of Table 8 except that the reluctive force or coercive force ($H_c$) of Co-γ-FeO$_x$ (magnetic material) in Table 8 was changed to 700 Oe and this magnetic material was used as a lower layer. The thickness of the support was 10 μm. The tension at the coating portion was 10 kg/500 mm. The coating quantity of the lower layer was 20 cc/m$^2$, and the coating quantity of the upper layer was 25 cc/m$^2$. The other conditions were established in the same manner as those of Example 1.

The viscosity in each of the coating compositions was measured. The viscosity of the lower layer coating composition was 0.3 poise at the shearing rate of $1 \times 10^4$ sec$^{-1}$. The viscosity of the upper layer coating composition was 0.3 poise at the shearing rate of $1 \times 10^4$ sec$^{-1}$.

Under the aforementioned conditions, the results of coating were estimated with $R_1$ kept to 12 mm while changing $R_2$ to various values. The estimated results were as shown in Table 9, in which symbols 0, X−1 and X−2 represent the same estimates as defined above in Example 1.

TABLE 8

| | |
|---|---|
| Co—γFeO$_x$ ($H_c$ = 700 Oe) | 100 parts by weight |
| Vinyl chloride acetate/vinyl alcohol copolymer (92:3:5, polymerization degree: 400) | 20 parts by weight |
| Polyester polyurethane (molecular weight: 50,000) | 5 parts by weight |
| Oleinic acid (industrial) | 2 parts by weight |
| Dimethyl polysiloxane (polymerization degree: 60) | 0.2 parts by weight |
| Carbon (particle size: 10 μm) | 1.0 part by weight |
| α-Al$_2$O$_3$ (particle size: 0.5μ) | 1.0 part by weight |
| Methylethyl ketone | 200 parts by weight |
| Cyclohexane | 50 parts by weight |

TABLE 9

| $R_2$ (mm) | 6 | 9 | 12 | 15 | 18 | 22 | 25 |
|---|---|---|---|---|---|---|---|
| Estimation of coating conditions | X−1 | 0 | 0 | 0 | 0 | 0 | X−2 |

It is apparent from Examples 4 and 5 that good coating can be attained in the case where $R_1$ and $R_2$ satisfy the relation, $-3 \text{ mm} \leq R_2 - R_1 \leq 15$ mm, in spite of the change of the coating compositions in the upper and lower layers.

Although the aforementioned examples have illustrated the preferred values of $R_1$ and $R_2$, the relative positions of the first doctor edge 5 and second doctor edge 6 have not been described. It is, however, assumed that the relative positions of the doctor edges are limited to some extent. In the following, the relative positions of $R_1$ and $R_2$ are examined.

EXAMPLE 6

The coating composition as shown in Table 1 was used as a lower layer. The coating composition as shown in Table 2 was used as an upper layer. The coating quantity in the lower layer was 15 cc/m$^2$, and the coating quantity in the upper layer was 10 cc/m$^2$. The support, 400 mm wide and 75 μm thick, was formed of polyethylene terephthalate. The tension at the coating portion was 20 kg/500 mm. The moving speed of the support was 200 m/min. Coating conditions were estimated with $R_1$ and $R_2$ kept respectively to 6 mm and 8 mm and the angles $\theta_1$, $\theta_2$ and $\theta_3$ are those shown in FIG. 4. The results of estimation were as shown in Table 10, in which the symbol @ represents an excellent coating condition, the symbol ○ represents such a good coating condition that it did not matter in practical application, the symbol *−1 represents failure in in application of the lower layer, and symbol *−2 represents failure in application of the upper layer.

It is apparent from Table 10 that the angles $\theta_1$, $\theta_2$ and $\theta_3$ expressing the relative positions of the first and second doctor edges have to satisfy the relations: $0.5° < \theta_1 \leq 35°$, $0° < \theta_2 \leq 25°$, and $0° < \theta_3 \leq 20°$, for a practical application. Particularly for more excellent application results, the angles have to satisfy the relations: $5° \leq \theta_1 \leq 20°$, $2° \leq \theta_2 \leq 15°$, $1° \leq \theta_3 \leq 15°$.

TABLE 10

| Angles of Edges (degree) | | | Estimation of |
|---|---|---|---|
| $\theta_1$ | $\theta_2$ | $\theta_3$ | Coating Conditions |
| 0 | 7 | 8 | *−1 |
| 1 | 7 | 8 | ○ |
| 5 | 7 | 8 | @ |
| 10 | 7 | 8 | @ |
| 15 | 7 | 8 | @ |
| 20 | 7 | 8 | @ |
| 30 | 7 | 8 | @ |
| 35 | 7 | 8 | @ |
| 40 | 7 | 8 | *−1 |
| 15 | 0 | 8 | *−1 |
| 15 | 1 | 8 | ○ |
| 15 | 5 | 8 | @ |
| 15 | 10 | 8 | @ |
| 15 | 15 | 8 | @ |
| 15 | 20 | 8 | @ |
| 15 | 25 | 8 | ○ |
| 15 | 30 | 8 | *−1 |
| 15 | 7 | 0 | *−2 |
| 15 | 7 | 1 | ○ |
| 15 | 7 | 5 | @ |
| 15 | 7 | 10 | @ |
| 15 | 7 | 15 | @ |
| 15 | 7 | 20 | @ |
| 15 | 7 | 25 | *−2 (*−1) |

What is claimed is:

1. A coating apparatus including an extrusion type head having a back edge, at least a first doctor edge and a second doctor edge, and at least two slots formed between said back edge and said doctor edges in which each of said first and second doctor edges is shaped to have a convex curvature in cross section taken along a direction of movement of a support to which a coating composition is to be applied through said slots,
   wherein said first doctor edge is disposed nearer to said back edge than said second doctor edge and a radius of curvature $R_1$ of said first doctor edge and a radius of curvature $R_2$ of said second doctor edge satisfy a first set of relations:
   $-3 \text{ mm} \leq R_2 - R_1 \leq 15$ mm
   $R_1 \geq 2$ mm, and
   $R_2 \geq 2$ mm.

2. A coating apparatus including an extrusion type head having a back edge, at least a first doctor edge and a second doctor edge, and at least two slots formed between said back edge and said doctor edges in which each of said first and second doctor edges is shaped to have a convex curvature in cross section taken along a direction of movement of a support to which a coating composition is to be applied through said slots, wherein a substantial inclination angle $\theta_1$ of a surface of said back edge, an angle $\theta_2$ between an extension of said surface of said back edge and a first tangent between an edge surface of said first doctor edge and a top x which is a slot exit end of said surface of said back edge in cross section of said extrusion type head, and an angle $\theta_3$ between an extension of said first tangent and a second tangent between an edge surface of said second doctor edge and a top y which is a slot exit end of said surface of said first doctor edge in cross section of said extrusion type head satisfy a second set of relations:

$0.5° < \theta_1 \leq 35°$
$0° < \theta_2 \leq 25°$ and
$0° < \theta_3 \leq 20°$.

3. A coating apparatus as recited in claim 2, wherein said second set of relations are restricted to $5° \leq \theta_1 \leq 25°$,
$2° \leq \theta_2 \leq 15°$ and
$1° \leq \theta_3 \leq 15°$.

4. A coating apparatus for coating a moving web moving in a first direction including an extrusion head having:

a back edge;

a first doctor edge disposed along said first direction from said back edge and forming a first slot therebetween for a first coating solution to be applied to said moving web; and a second doctor edge disposed along said first direction from said first doctor edge and forming a second slot therebetween for a second coating solution to be applied to said moving web;

wherein both of said first and second doctor edges is shaped to have a convex curvature in a cross section taken along said first direction, and wherein a radius of curvature $R_1$ of said first doctor edge and a radius of curvature $R_2$ of said second doctor edge satisfy relations:

$-3 \text{ mm} \leq R_2 - R_1 \leq 15 \text{ mm}$
$R_1 \geq 2$ mm, and
$R_2 \geq 2$ mm.

5. A coating apparatus as recited in claim 4, wherein each of said doctor edges has a width within a range of 0.5 mm to 5 mm.

6. A coating apparatus according to claim 5, in which a substantial inclination angle $\theta_1$ of a surface of said back edge, an angle $\theta_2$ between an extension of said surface of said back edge and a first tangent between an edge surface of said first doctor edge and a top x which is a slot exit end of said surface of said back edge in cross section of said extrusion type head, and an angle $\theta_3$ between an extension of said first tangent and a second tangent between an edge surface of said second doctor edge and a top y which is a slot exit end of said edge surface of said first doctor edge in cross section of said extrusion type head satisfy a second set of relations:

$5° \leq \theta_1 \leq 25°$,
$2° \leq \theta_2 \leq 15°$ and
$1° \leq \theta_3 \leq 15°$.

* * * * *